(12) United States Patent
Fu et al.

(10) Patent No.: US 9,467,681 B2
(45) Date of Patent: Oct. 11, 2016

(54) REPRESENTATION AND COMPRESSION OF DEPTH DATA

(71) Applicant: Microsoft Technology Licensing, LLC, Redmond, WA (US)

(72) Inventors: Jingjing Fu, Beijing (CN); Dan Miao, Tianjin (CN); Yan Lu, Beijing (CN); Shipeng Li, Palo Alto, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 618 days.

(21) Appl. No.: 13/850,173

(22) Filed: Mar. 25, 2013

(65) Prior Publication Data

US 2014/0285626 A1 Sep. 25, 2014

(51) Int. Cl.
*H04N 13/02* (2006.01)
*H04N 13/00* (2006.01)
*H04N 19/597* (2014.01)
*H04N 19/85* (2014.01)
*H04N 19/36* (2014.01)

(52) U.S. Cl.
CPC ...... *H04N 13/0271* (2013.01); *H04N 13/0022* (2013.01); *H04N 13/0048* (2013.01); *H04N 19/36* (2014.11); *H04N 19/597* (2014.11); *H04N 19/85* (2014.11)

(58) Field of Classification Search
CPC ............. H04N 13/0271; H04N 13/0022; H04N 13/0048; H04N 19/597; H04N 19/85; H04N 19/36

See application file for complete search history.

(56) References Cited

U.S. PATENT DOCUMENTS

| | | | |
|---|---|---|---|
| 2002/0138042 A1* | 9/2002 | Llorach | A61M 5/343 604/187 |
| 2002/0181580 A1* | 12/2002 | Van Der Schaar | H04N 19/61 375/240.01 |
| 2005/0271283 A1* | 12/2005 | Dekel | H04N 1/3873 382/232 |
| 2006/0159359 A1* | 7/2006 | Lee | H04N 19/63 382/240 |
| 2007/0058056 A1* | 3/2007 | Kaplinsky | H04N 5/3675 348/272 |
| 2009/0073008 A1* | 3/2009 | Kim | G10L 19/24 341/67 |
| 2009/0102850 A1* | 4/2009 | Liang | G09G 3/2059 345/545 |
| 2012/0212488 A1* | 8/2012 | Yu | G06T 15/40 345/422 |

* cited by examiner

*Primary Examiner* — Tat Chio
(74) *Attorney, Agent, or Firm* — Sandy Swain; Micky Minhas; Lee & Hayes, PLLC

(57) ABSTRACT

The techniques and arrangements described herein provide for layered compression of depth image data. In some examples, an encoder may partition depth image data into a most significant bit (MSB) layer and a least significant bit (LSB) layer. The encoder may quantize the MSB layer and generate quantization difference data based at least in part on the quantization of the MSB layer. The encoder may apply the quantization difference data to the LSB layer to generate an adjusted LSB layer.

20 Claims, 12 Drawing Sheets

REPRESENTATION AND COMPRESSION OF DEPTH DATA

BACKGROUND

In recent decades, various depth detection devices have been developed to represent the physical world in a three-dimensional (3D) fashion, such as time-of-flight (TOF) sensors, stereo cameras, laser scanners, and structured light devices. Depth detection devices typically measure the distance from the device to a target object, but their working principles vary. For example, a TOF sensor may measure depth by detecting a light wave phase shift after reflection, while a stereo camera may be used to generate a disparity map by stereo matching.

Depth data generated by these different types of devices can exhibit different data characteristics. In addition, the size of the depth data generated may impose significant transmission and storage costs. For instance, while image/video compression methods can, in the abstract, be used for some types of depth data compression, noise and instability associated with the depth data can make actual use of such image/video compression methods problematic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide for techniques and arrangements for layered compression of depth image data. In some examples, an encoder may partition depth image data into a most significant bit (MSB) layer and a least significant bit (LSB) layer. The encoder may quantize the MSB layer and generate quantization difference data based at least in part on the quantization of the MSB layer. The encoder may apply the quantization difference data to the LSB layer to generate an adjusted LSB layer.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
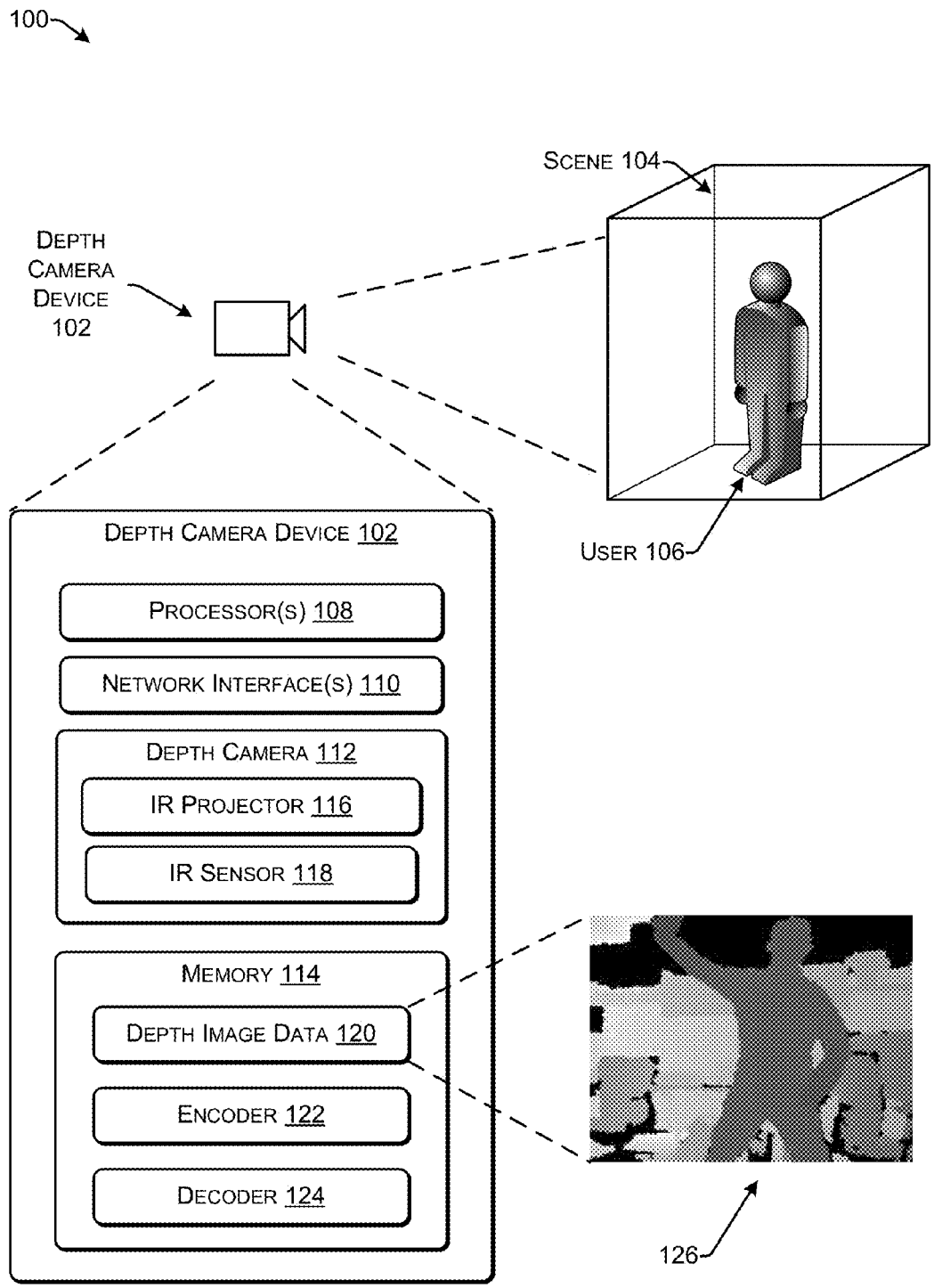
FIG. 1 illustrates an example environment including a depth camera device configured with layered compression functionality.

Some implementations herein provide techniques and arrangements that may enable, among other things, compression of depth data generated by a depth camera. Specifically, in some implementations provided herein, the depth data may be partitioned into a plurality of layers. More particularly, in some implementations, the N-bit depth data may be segmented into at least two layers, for example, an M-bit most significant bit (MSB) layer and an L-bit least significant bit (LSB) layer. In some implementations, the layers may be subjected to different encoding and/or compression. For example, when compared to the LSB layer, the MSB layer may provide a coarse or rough depth value but may have a greater influence on any reconstructed depth data than the LSB layer. On the other hand, the LSB layer may include more fine detail of the depth data than the MSB layer. As such, in some implementations, the MSB layer may be losslessly encoded while the LSB layer may be lossy encoded. More discussion of such an implementation is provided with respect to FIG. 4.

The functionality described herein may be implemented at various levels in the software and hardware of computing systems. Such levels include a dedicated hardware level, such as in an image processor of a depth camera device, an Operating System (OS) level, such as in the OS with or without application support, the application level, either separate from OS (i.e., stand-alone) or as a plug-in to the OS or a plug-in to another application and so forth. For example, in some implementations, the layered compression functionality may be implemented by an image processor of a depth camera device. In other implementations, the layered compression functionality may be implemented at an application level by a compression or conversion program operating on depth image data in, for example, an uncompressed or differently compressed form. For simplicity, the discussion herein will assume that the layered compression functionality is performed by depth camera device that captures the depth image data.

Herein, specific values are used for bit depths of various data. As used herein, the bit depth of data is the number of bits used to represent the data. Implementations are not limited to such and the bit depth may vary from implementation to implementation. Moreover, while the implementations discussed below with respect to the drawing figures discuss depth image data, it should be understood that implementations are not so limited and that, in some implementations, the layered compression may be applied to other types of data, such as texture image data. Further, it should be noted that while the implementations discussed herein refer to depth cameras, other types of depth detection devices may be used in various implementations. For simplicity, as used herein, the term "depth camera" includes depth cameras and other depth detection devices and thus includes but is not limited to time-of-flight (TOF) sensors, stereo cameras, laser scanners, and structured light devices.

For readability, interactions between modules or components may be described herein as signals, commands or the passage of data items, but it would be understood by one of ordinary skill in the art that such interactions may be implemented in various ways, such as by function calls between various program modules.

Example Implementations

FIG. 1 illustrates an example environment 100 that includes a depth camera device 102 according to some implementations. In some implementations, the depth camera device 102 illustrated in FIG. 1 may provide layered compression functionality with respect to depth image data. The depth camera device 102 is illustrated as taking depth images of a scene 104 that includes a user 106. The depth camera device 102 may include one or more processor(s) 108, or more network interfaces 110, a depth camera 112, and a memory 118. The depth camera 112 may include an infrared (IR) projector 114 and an IR sensor 116. Further, the memory 118 may include depth image data 120 generated by the depth camera 112, an encoder 122 and a decoder 124. In some implementations, the IR projector 114 projects infrared light onto objects, such as the user 106, in the scene 104 and the IR sensor 116 captures the reflected infrared light. The depth images may be generated based on the captured infrared light and the depth camera 112 may generate the depth image data 120 to be stored in the memory 118 for use by an encoder 122 and/or a decoder 124 that are also stored in the memory 118. An example of a depth image data 120 for a possible depth image of the scene 104 is given by item 126. Of course, the environment 100 is but one example environment in which the techniques and arrangements may operate and is provided to allow for an example context for the explanation to follow. The techniques and arrangements are certainly not limited to this environment.

Figure 2:
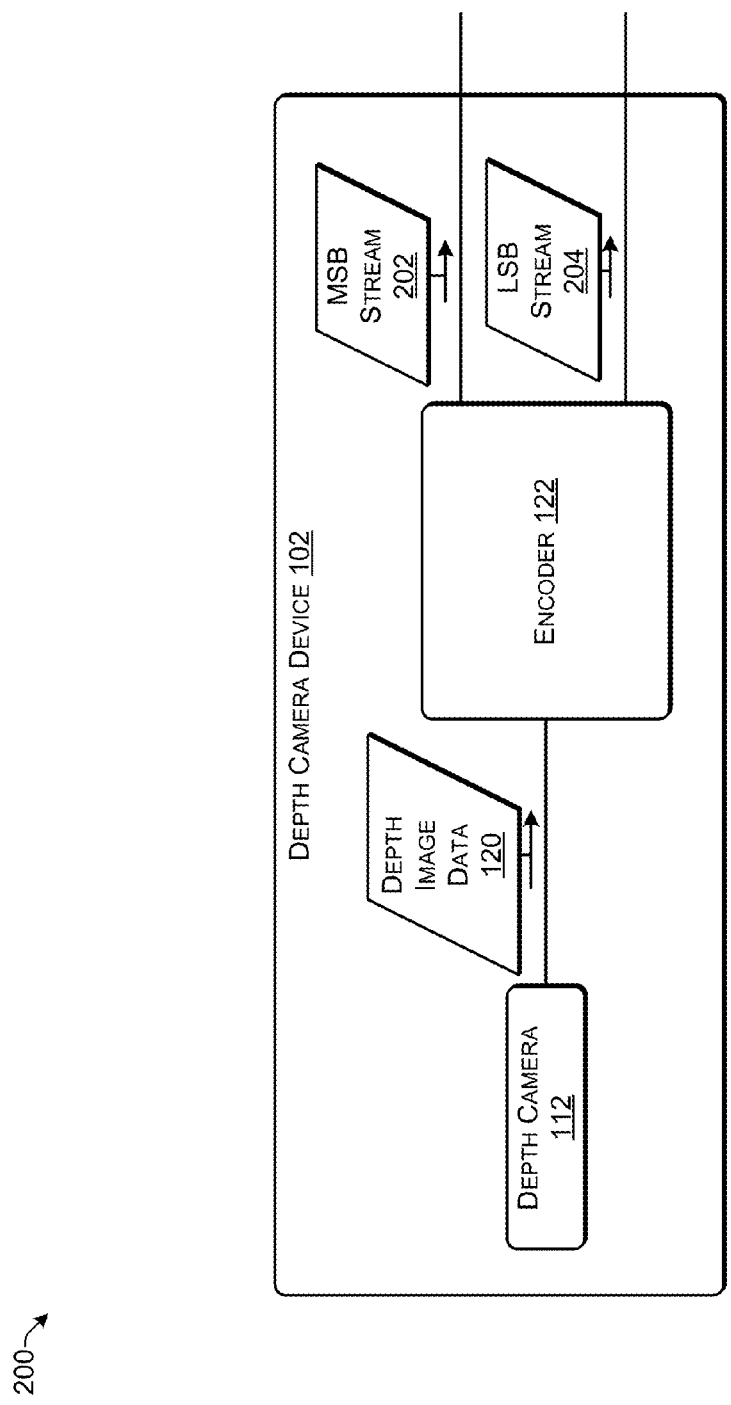
FIG. 2 is an example logical diagram of an illustrative depth camera device configured with layered compression functionality.

FIG. 2 illustrates an example logical diagram of the high level operation of an example implementation of the depth camera device 102. In particular, the depth camera 112 captures depth image data 120 and sends the data 120 to the encoder 122. The encoder 122 operates to partition the depth image data 120 into an MSB layer that is encoded and output as an MSB stream 202 and an LSB layer that is encoded and output as an LSB stream 204. As indicated previously, the MSB layer can be considered to provide a coarse depth value and the LSB layer provides additional detail when applied to the MSB layer. Further, the different layers may be encoded using different types of encoding.

Figure 3:
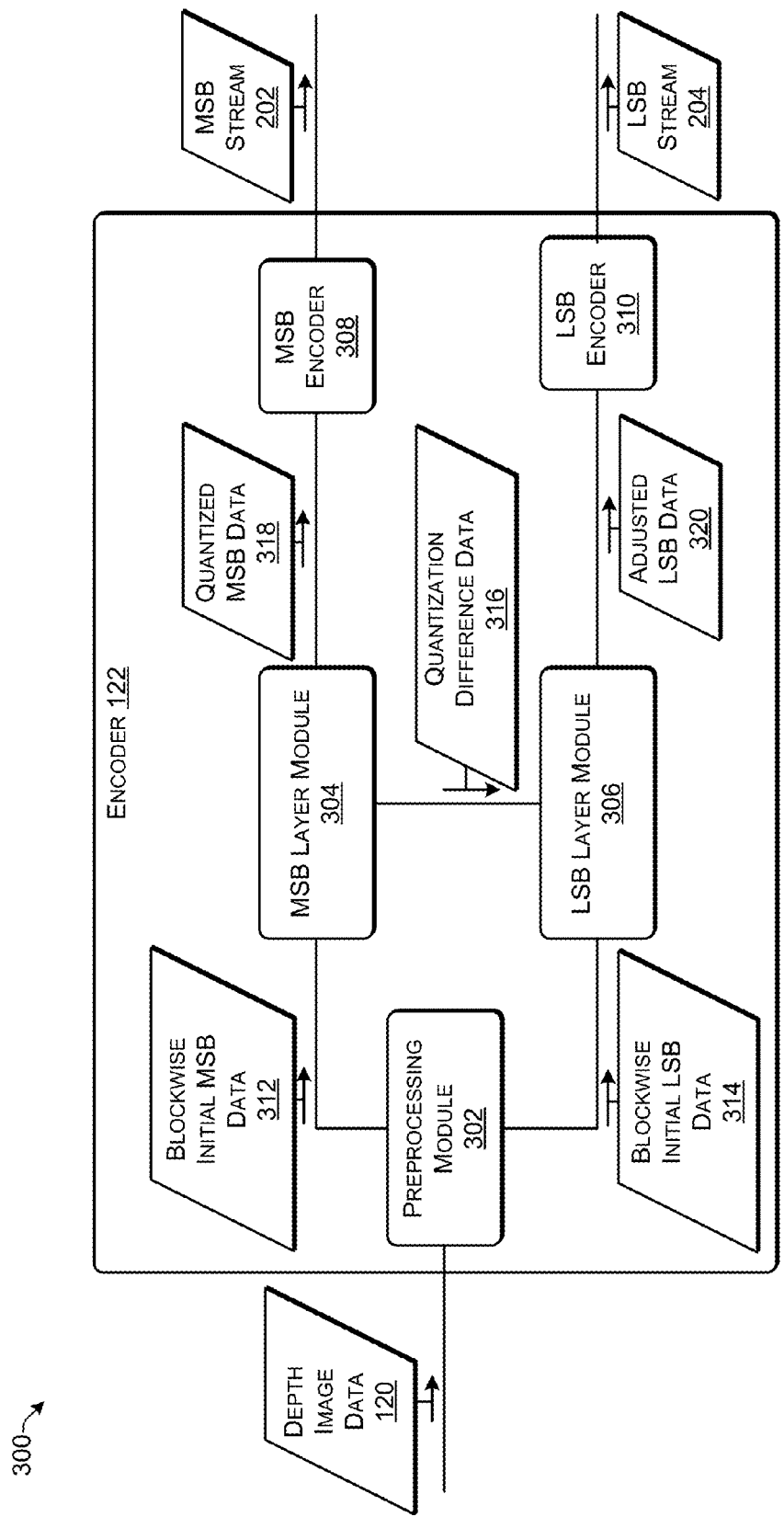
FIG. 3 is an example logical diagram of an illustrative encoder with layered compression functionality according to some implementations.

FIG. 3 illustrates an example logical diagram of the high level operation of an example implementation of the encoder 122. As illustrated in FIG. 3, the encoder 122 may include a preprocessing module 302, an MSB layer module 304, an LSB layer module 306, an MSB encoder 308 and a LSB encoder 310.

Figure 6:
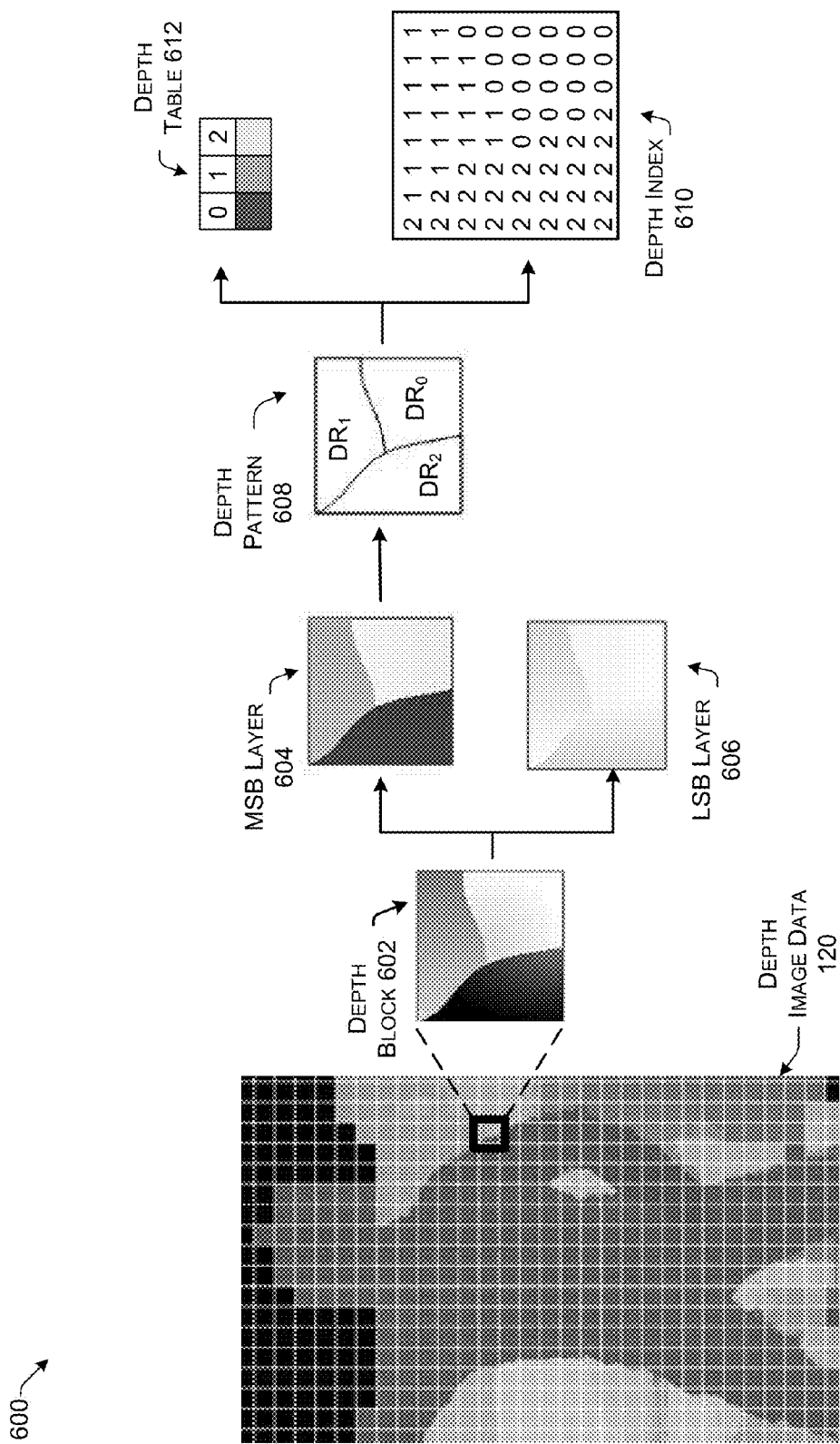
FIG. 6 is an example data flow diagram of an illustrative data flow of layered compression according to some implementations.

In operation, the encoder 122 receives the depth image data 120 at the preprocessing module 302. The preprocessing module 302 may operate to segment the depth image data 120 into sub-images, such as blocks of the depth image, and then to partition the depth image data 120 on a per-pixel level to create block-wise initial MSB data 312 and block-wise initial LSB data 314. The preprocessing module may perform various other preprocessing operations on the depth image data 120, some examples of which are described below with respect to FIG. 11. The preprocessing module 302 outputs the block-wise initial MSB data 312 and the block-wise initial LSB data 314 to the MSB layer module 304 and the LSB layer module 306, respectively. While discussed herein as utilizing block-wise sub-images of the depth image data 120, implementations are not so limited and further processing may be performed on other sub-images or on the depth image as a whole. An example of the segmentation of the depth image data 120 into blocks is illustrated in FIG. 6 and discussed below.

In the example implementation shown in FIG. 3, the MSB layer module 304 operates to quantize the block-wise initial MSB data 312 at a per-block level and to output quantization difference data 316 to the LSB layer module 306 for use in adjusting the block-wise initial LSB data 314 of the corresponding block. In general, the MSB layer module 304 quantizes the block-wise initial MSB data 312 by segmenting the blocks of the depth image data 120 into sub-regions or groups of pixels based on the depth value distribution of the block. Each sub-region or group of pixels is assigned a quantized MSB value for use as the MSB value of the sub-region or group. For each pixel of the block of the depth image data 120, the quantization difference data 316 includes the difference between MSB value of the pixel in the block-wise initial MSB data 312 and the quantized MSB value assigned to the pixel. The MSB layer module 304 further outputs the quantized MSB layer data 318. An example of the quantization process is discussed with respect to FIGS. 5 and 6.

The LSB layer module 306 receives the block-wise initial LSB data 314 from the preprocessing module 302 and the quantization difference data 316 from the MSB layer module 304. The LSB layer module 306 merges the quantization difference data 316 and the block-wise initial LSB data 314 to generate adjusted LSB data 320. For example, in some implementations, the LSB layer module 306 may add the quantization difference values to the block-wise initial LSB data 314 at a per-pixel level. The quantized MSB data 318 and the adjusted LSB data 320 are received and processed by the MSB encoder 308 and LSB encoder 310, respectively, to produce the MSB stream 202 and the LSB stream 204.

Figure 4:
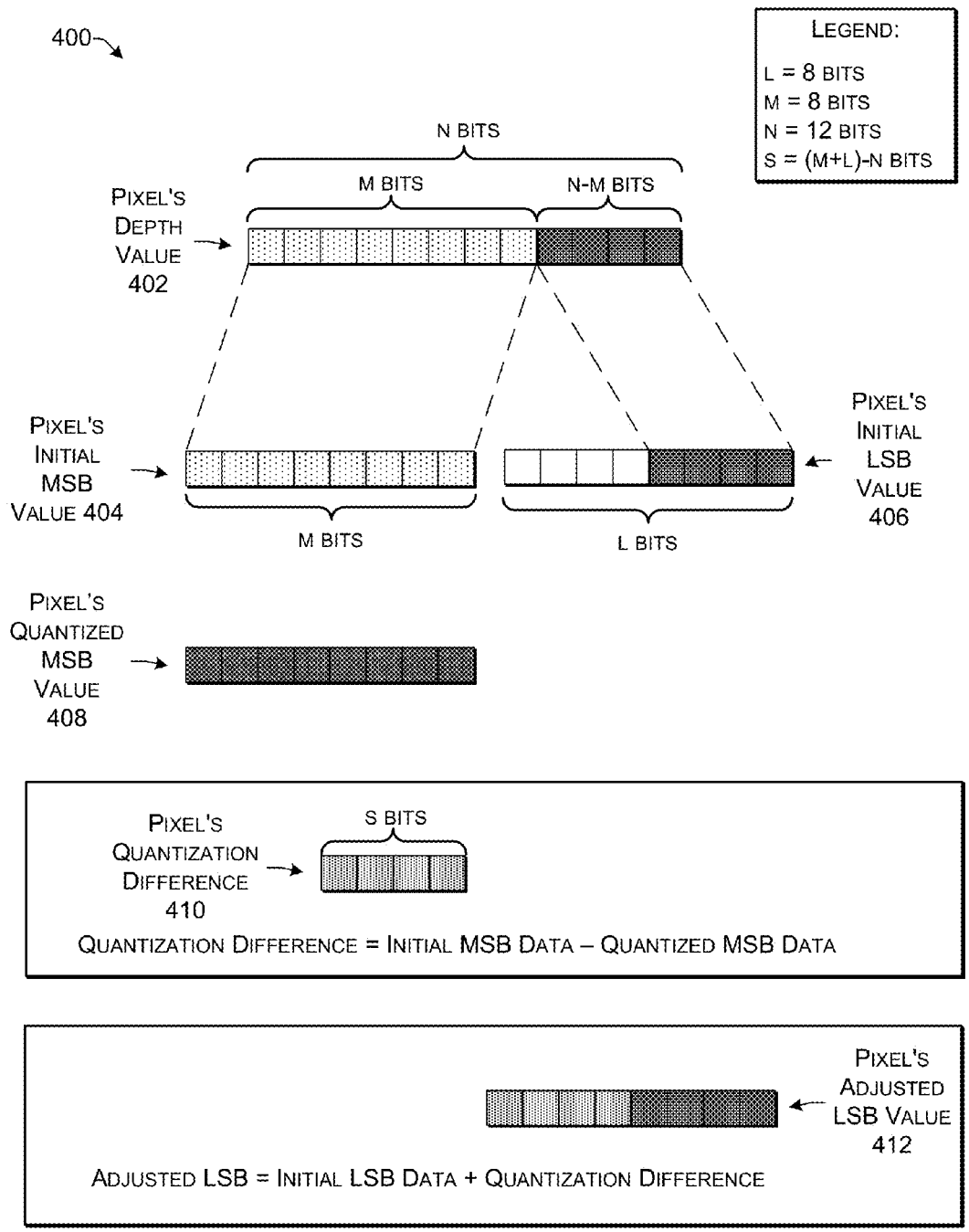
FIG. 4 is an example diagram of an illustrative data flow of an implementation of layered compression according to some implementations.

FIG. 4 illustrates an example diagram 400 of the data flow operations discussed above with respect to FIG. 3 in an implementation including twelve-bit (12-bit) depth image data (i.e., N=12). Specifically, for each pixel in the depth image data 120, the eight most significant bits of the pixel's depth value 402 are taken as the pixel's initial MSB value 404 (i.e., M=8) and the remaining four bits of the pixel's depth value 402 are taken as the four lowest bits of the pixel's initial LSB value 406 (i.e., L=8 and (N−M)=4). The upper four bits of the pixel's initial LSB value 406 are initially zero. The pixel's quantized MSB value 408 (as determined by the MSB layer module 304) is then subtracted from the pixel's initial MSB value 404 to generate the pixel's quantization difference 410. As shown in FIG. 4, the pixel's quantization difference 410 is a four bit (4-bit) number which is the difference between the total number of bits in the MSB layer and the LSB layer and the number of bits in the pixel's depth value 402 (i.e., S=(M+L)−N bits). As stated above with respect to FIG. 3, the pixel's quantization difference 410 is added to the pixel's initial LSB value 406 to generate the pixel's adjusted LSB value 412. It should be noted that while the data flow of FIG. 4 is discussed with respect to particular numbers of bits, other numbers of bits may be used for any given implementations of the partitioning of the depth image data 120. For example, in some implementations, the value of N maybe a number in the range of 9-16 rather than 12.

Figure 5:
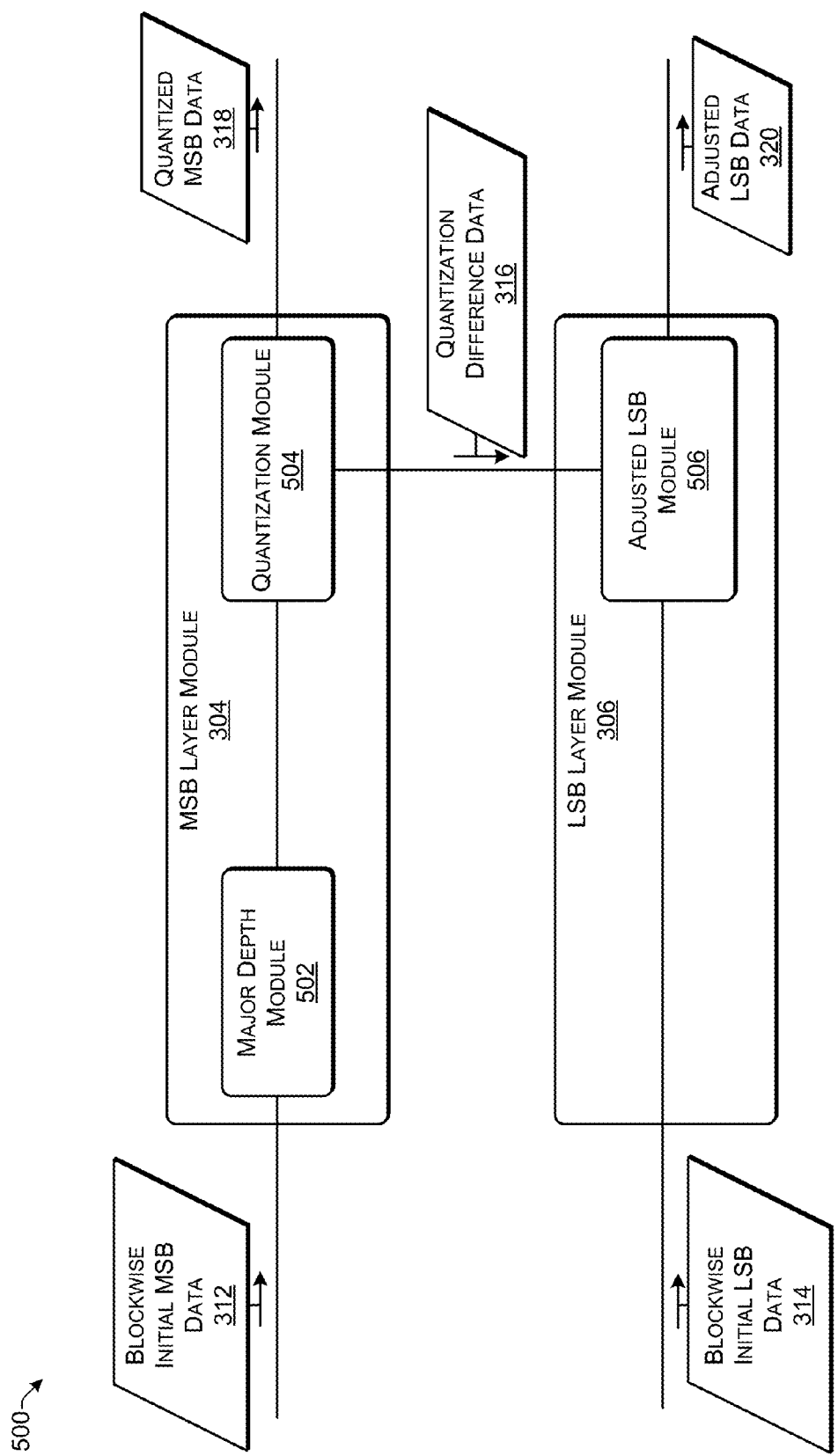
FIG. 5 is an example logical diagram of a portion of an encoder with layered compression functionality according to some implementations.

FIG. 5 illustrates an example diagram 500 the operation of the MSB layer module 304 and LSB layer module 306 according to some implementations. As shown in FIG. 5, the MSB layer module 304 may include a major depth module 502 and a quantization module 504 and the LSB layer module 306 may include an adjusted LSB module 506. In the implementation illustrated in FIG. 5, the MSB layer module 304 and LSB layer module 306 process the depth image data 120 at a per-block level. However, this is not a limitation and other implementations may process other portions of or the whole of the depth image.

In operation, the major depth module 502 receives the block-wise initial MSB data 312. The major depth module 502 processes each block to determine if the range of MSB values in the block is greater than the range representable by the quantization difference data 316 (shown in the example of FIG. 4. as four bits). If not, the average MSB value of the pixels in the block may be used as a quantized MSB value of that block (i.e., the quantized MSB data 318 of the block). If the range of the MSB values in the block is greater than the range representable by the quantization difference data 316, the block may be segmented based on the MSB value distribution in the block into segments or groups of pixels that each has a range of MSB values that may be represented by the quantization difference data 316. In some implementations, the division process may allow for outlier values to be excluded from the range determinations. For example, in a case in which a segment has a small number of pixels with a value outside of the range that may be represented by the quantization difference data 316, the segmentation process may identify these pixels as "escaped pixels" and not subdivide the segment. In some implementations, the escaped pixels may be handled in a different manner, an example of which is discussed below with regard to FIG. 9.

In one example segmentation process, the range of MSB values in the block may be determined and compared to the range representable by the quantization difference data 316. If the range is greater than the range representable by the quantization difference data 316, the median value of the MSB values of block is determined. The pixels having a MSB value greater than the median value may be assigned to a first segment. The pixels having a MSB value less than or equal to the median value may be assigned to a second segment. The process is repeated iteratively for each segment until the resulting segments have ranges of MSB values that can be represented by the quantization difference data 316.

Once the segments have ranges of MSB values that can be represented by the quantization difference data 316, a quantized MSB value (also referred to herein as a major depth) may be determined for each segment and each segment may be assigned a segment label. For example, in a block that includes three segments, the segments could be assigned two bit binary segment labels (e.g. "00," "01" and "10"). The quantized MSB values of the segments may be assigned using various determinations. For example, in some implementations, the minimum MSB value of each segment may be chosen as the quantized MSB value of the segment. In other implementations, the median MSB value may be chosen as the quantized MSB value of the segment. In still other implementations, the mode of the MSB values of each segment (i.e., the MSB value that appears most often in a segment) may be chosen as the quantized MSB value of the segment. In the particular implementation illustrated in FIGS. 5 and 6, the minimum MSB value of each segment is chosen as a quantized MSB value of the segment. Although discussed above as being determined by the major depth module 502, the quantized MSB values may be determined subsequently by the quantization module 504 in other implementations.

In some implementations, using the segment labels, a depth index that maps the pixels of the block to their corresponding segment labels may be created (see FIG. 6). The depth index and a depth table that maps the segment numbers to the quantized MSBs of the segments may then be output to the quantization module 504. FIG. 6 illustrates an example depth index and depth table and is discussed below. Although discussed herein as providing a depth index and depth table to the quantization module 504, the major depth module 502 is not so limited and may provide the segmentation information in various other forms.

The quantization module 504 receives the segmentation information and, optionally, the quantized MSB values of the segments from the major depth module 502 (e.g. in the form of a depth index and depth table). In implementations in which the quantization module 504 did not receive the quantized MSB values, the quantization module 504 may generate this information in a manner similar to that discussed above. Using the received and optionally generated information, the quantization module 504 generates a quantization difference for each pixel. As discussed above, the quantization difference data 316 may be indicative of the difference between the initial MSB value of the pixel and the quantized MSB value assigned to the pixel.

The adjusted LSB module 506 receives the block-wise initial LSB data 314 and the quantization difference data 316. For each block, the adjusted LSB module 506 may apply the quantization difference values of the pixels of the block to those pixels' initial LSB values to generate the adjusted LSB values of the pixels. These adjusted LSB values may then be output as the adjusted LSB data 320.

FIG. 6 illustrates an example diagram 600 of several stages in the partitioning of the depth image data 120 into a MSB layer and an LSB layer. First, the depth image data 120 is divided into blocks, such as depth block 602 and partitioned into a MSB layer and a LSB layer (not shown). For each block, the range of the values of the MSB layer of the block is determined. If the range of the block exceeds the available range of the quantization difference data 316 (e.g. in the case of a four bit quantization difference, a range sixteen (16) values wide or from X+0 to X+15), the block may be segmented according to its depth value distribution in the manner or in a similar manner to that discussed above with regard to FIG. 5. If the range of values in the MSB layer of the block is equal to or smaller than the range representable by the quantization difference, a value within the range, such as a mean, mode or median value of the MSB block, is determined as the quantized MSB value of the block.

The MSB layer is segmented and quantized to generate a MSB layer 604 that is quantized. In particular, the MSB layer 604 of the depth data block 602 is shown in FIG. 6 to be divided into three depth segments (i.e., DR0, DR1 and DR2 which correspond to areas in the depth block 602) that have MSB values within a range representable by the quantization difference data 316. The MSB values may be quantized to produce the MSB layer 604 and the difference between the MSB values of the depth block 602 and the quantized MSB values may be used to product the quantization difference data 316. The quantization difference data 316 may then be applied to the initial LSB values of the depth block 602 to produce the LSB layer 606.

As discussed above, the quantized MSB layer 604 may be represented by using the depth pattern 608 to generate a depth index 610 and corresponding depth table 612 which may then be output to the MSB encoder 308 for encoding. Similarly, the LSB layer 606 may be output to the LSB encoder 310 for encoding.

Figure 7:
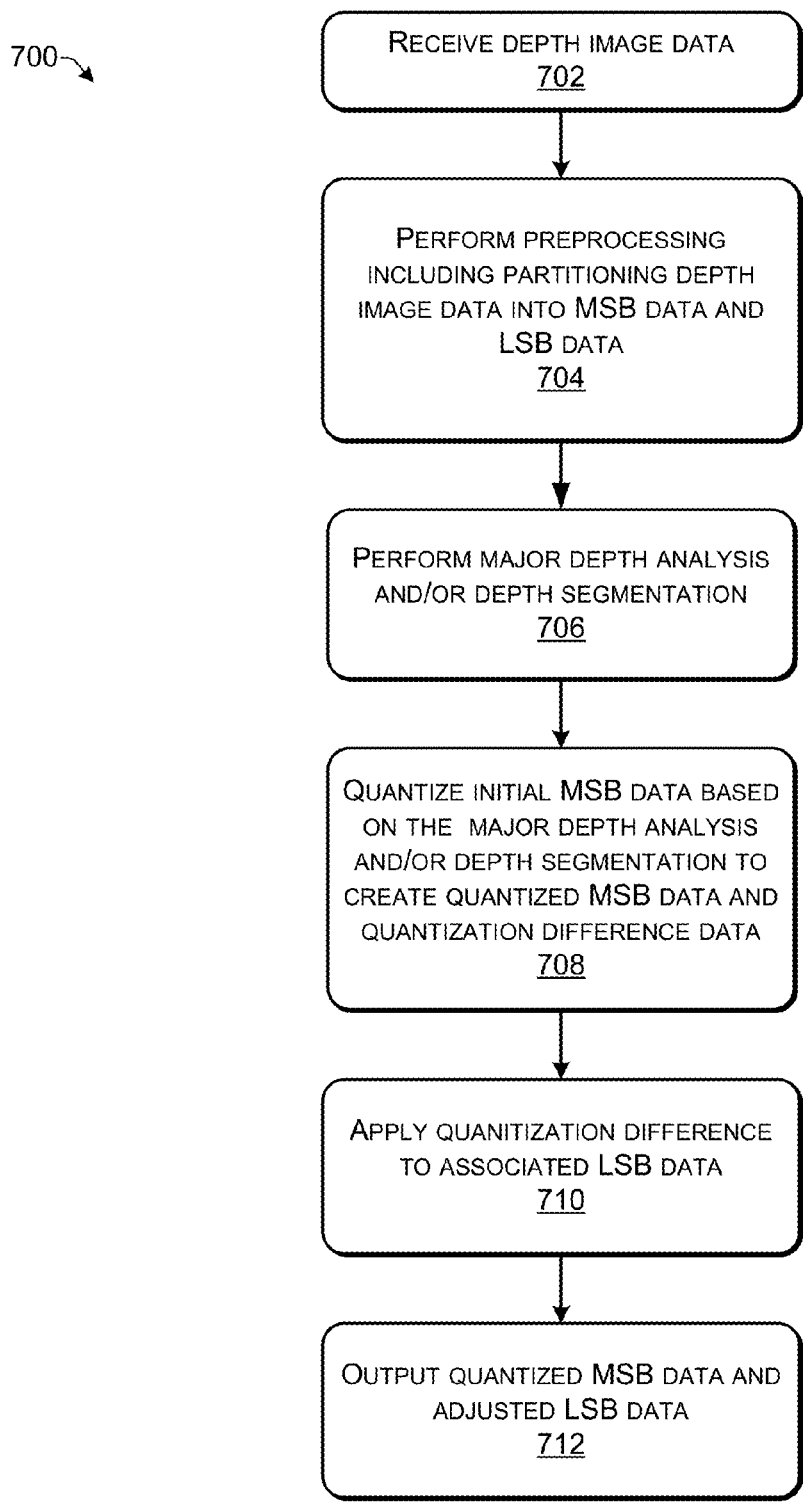
FIG. 7 is a flow diagram of an illustrative process to perform layered compression according to some implementations.

FIG. 7 illustrates an example process flow 700 according to some implementations. In this particular case, the process flow illustrates the partitioning of the depth image data 120 to output quantized MSB data and adjusted LSB data. In the flow diagrams of FIG. 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process flow 700 is described with reference to the systems and frameworks 100, 200, 300 and 500, described above, although other models, frameworks, systems and environments may implement the illustrated process.

At 702, an encoder receives depth image data (e.g. depth image data 120). At 704, the preprocessing module performs preprocessing on the depth image data including segmenting the depth image data into blocks and partitioning the depth data into MSB data and LSB data.

At 706, the MSB layer module performs the major depth analysis and depth segmentation on the MSB values of each block. At 708, the MSB layer module quantizes the MSB layer based on the major depth analysis and depth segmentation to generate the quantized MSB data and quantization difference data.

At 710, the LSB layer module receives the LSB data and quantization difference data. The LSB layer module then applies the quantization difference data to the associated LSB data to generate the adjusted LSB data.

At 712, the encoder outputs the quantized MSB data and adjusted LSB data. This completes the process.

Process flow 700 shown in FIG. 7 can be implemented with many variations that would be apparent to one of ordinary skill in the art in view of the disclosure provided herein. One aspect that can be varied is whether the steps are performed sequentially or in parallel. Another variation may involve the order in which the various determinations and/or operations are performed. These and other variations on the implementation of the layered compression mechanism and process would be apparent to one of ordinary skill in the art in view of the disclosure herein.

Figure 8:
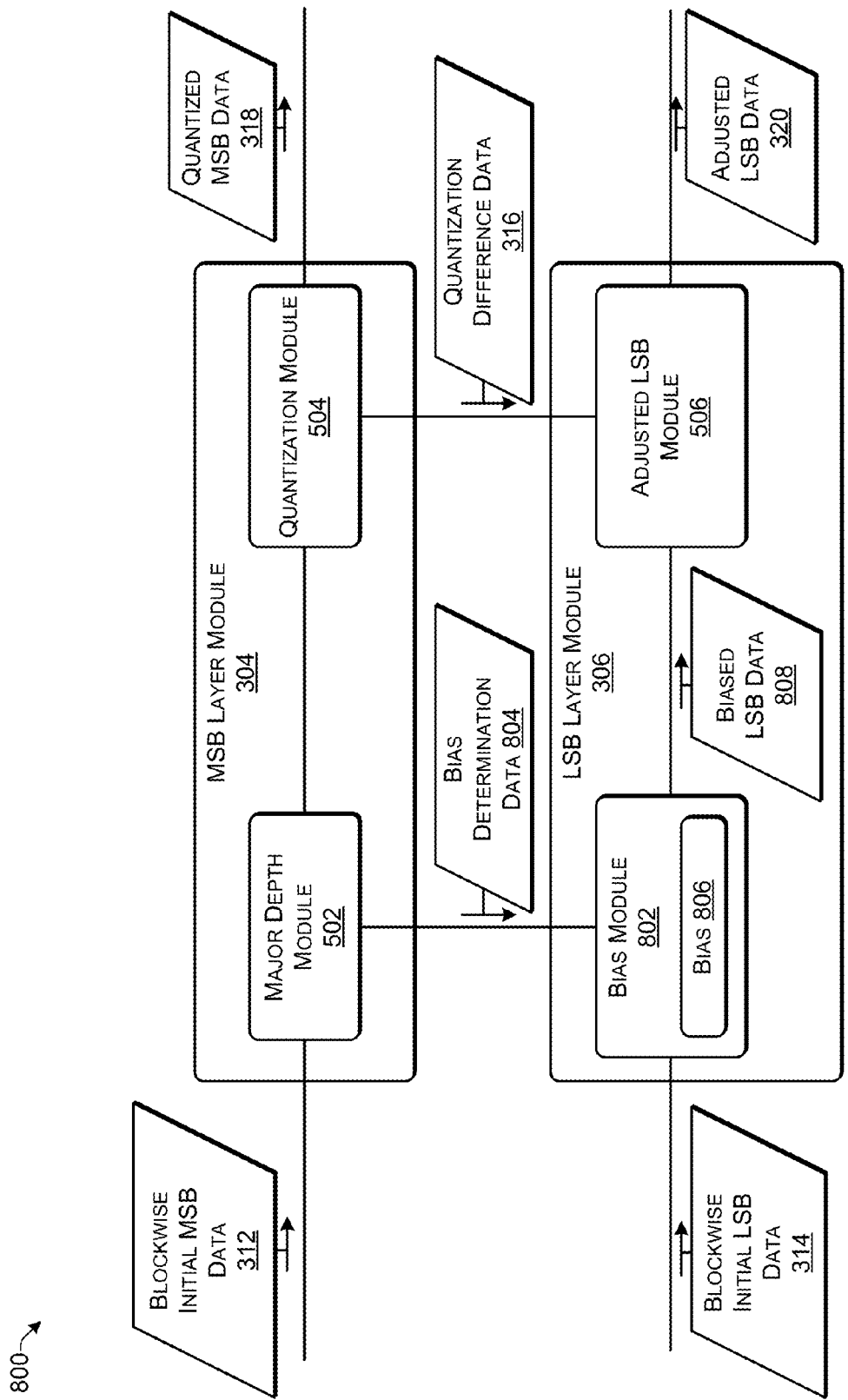
FIG. 8 is an example logical diagram of a portion of an encoder with layered compression functionality according to some implementations.

FIG. 8 illustrates a diagram of an example operation of the MSB layer module 304 and LSB layer module 306 according to some implementations. Specifically, FIG. 8 illustrates a modified implementation of that shown in FIG. 5. More particularly, FIG. 8 illustrates an implementation in which the quantized MSB data 318 is, for example, the mode of the MSB values of the block-wise initial MSB data 312. For brevity, the discussion of FIG. 8 is limited to how the operation of the MSB layer module 304 and LSB layer module 306 differ in FIG. 8 from the operation discussed above with respect to FIG. 5. In addition to the components discussed above with respect to FIG. 5, the LSB layer module 306 further includes a bias module 802.

In operation, the major depth module 502 shown in FIG. 8 receives the block-wise initial MSB data 312 and performs the operation discussed above with respect FIG. 5. Specifically, the major depth module 502 may segment the blocks corresponding to the block-wise initial MSB data 312 and determine quantized MSB values for the segments of the blocks. As indicated above, in the implementation shown in FIG. 8, the mode of the MSB values of each segment may be selected to be the quantized MSB value of that segment. The quantization difference data 316 may be either positive or negative in such an implementation. As a result, if the initial LSB value of a pixel is less than the quantization difference value determined for that pixel, the adjusted LSB value of the pixel will be negative. In some implementations, it may be useful for the adjusted LSB data 320 to be a positive number or zero. As such, in the implementation illustrated in FIG. 8, the major depth module 502 provides bias determination data 804 to the bias module 802.

Using the bias determination data 804, the bias module 802 determines a bias 806 to be added to the initial LSB values of each segment. The bias 806 may be determined to be the absolute value of the difference of the smallest MSB value in the segment and the quantized MSB of the segment. In another example implementation in which the midpoint value of the range of MSB values of each segment is selected as the quantized MSB of the segment, the bias 806 may be determined as half of the range representable by the LSB layer (e.g. 128 in the case of an 8-bit LSB layer). Of course, implementations are not limited to these examples and other variations could be envisioned.

Once the bias is determined, it is added to the initial LSB values of the pixels in the corresponding segment. The biased LSB data 808 is then output to the adjusted LSB module 506 which applies the quantization difference data 316 to the biased LSB data 808 to produce the adjusted LSB data 320.

In the above example implementations, segmentation of the depth image data was described as being performed iteratively based on the median MSB value of the pixels in the segments being divided into sub-segments. Implementations are not limited to such an approach. For example, in some implementations, the segmentation may be performed with respect to the depth value rather than the MSB value. Such implementations may subdivide the blocks of the depth image, such as depth block 602, into segments with a depth value range of 256 (i.e., X+0 to X+255). Other implementations may segment the depth blocks using a different process and/or may adaptively segment of the depth blocks. Such an example is described below with regard to FIG. 9.

Figure 9:
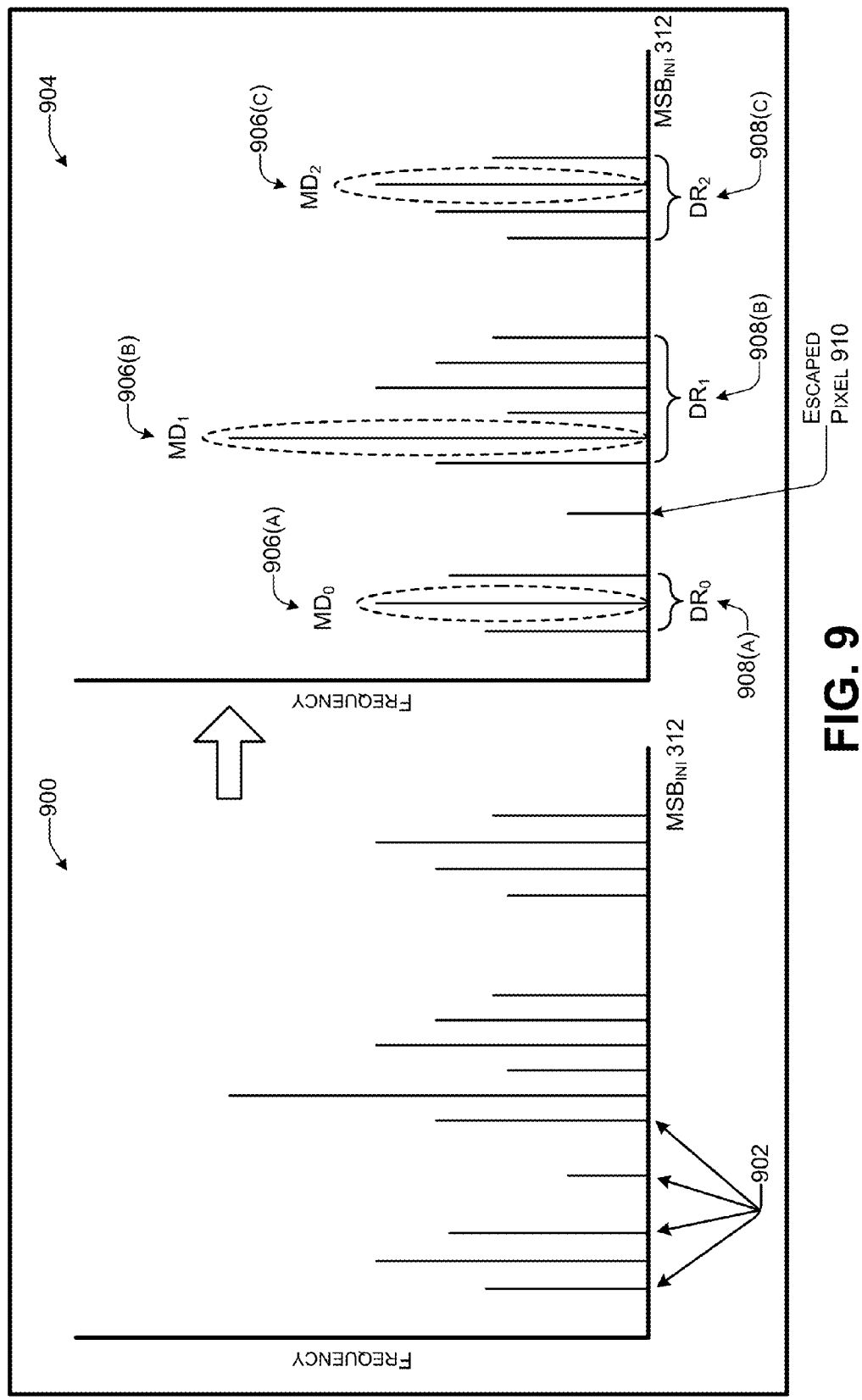
FIG. 9 is an example diagram of an illustrative segmentation process of some implementations of layered compression.

FIG. 9 is a diagram illustrating an example of the selection of major depths for segmentation of a depth block using a histogram 900 of the frequency of occurrence of MSB values in the block-wise initial MSB data 312. Each vertical line 902 in histogram 900 is representative of the frequency of occurrence of a MSB value in the block-wise initial MSB data 312 of the depth block. The histogram 904 illustrates the results of the major depth analysis and segmentation of the histogram 900. In particular, in the alternative segmentation process utilized with respect to FIG. 9, the peaks of the histogram 900, the most common values, are selected as the major depths or quantized MSBs. In the histogram 904, the major depths are indicated as $MD_0$ 906(a), $MD_1$ 906(b), and $MD_2$ 906(c). Using the major depths, adaptive quantization ranges are determined for the major depths. Some example ranges are illustrated in FIG. 9 as $DR_0$ 908(a), $DR_1$ 908(b), and DR$_2$ 908(c). In particular, the ranges shown in histogram 904 are adaptively sized automatically to the ranges of continuous depths in the histogram 904 (i.e., ranges around the major depths that have no gaps). These adaptive sizing criteria may be desirable in some implementations because the adjacent depths in the histogram may represent one object. As such, merging the depth values from the same object into one major depth is a benefit that may be obtained along with a smooth LSB data image and a depth index map as few major depths as possible. As mentioned previously, in some implementations that allow a limited number of the major depths to be assigned, some pixels "escape" the quantization ranges. The handling of these escaped pixels depends on the implementation. For example, in some implementations a "last" depth label of the depth table is a depth label that is assigned to escaped pixels. The depth value of the escaped pixels may then be encoded directly without quantization.

The implementations are not limited to any particular process for segmenting the depth image data. However, two example pseudocode processes for performing the segmenting of the depth image data are discussed below.

The first example depth image data segmentation process is adapted to avoid leaving significant stepwise signals in the adjusted LSB data. More particularly, the first depth segmentation process may be useful, for example, in implementations in which a regular stepwise fluctuation commonly exists in smooth depth regions. In such depth image data, a discontinuity of the non-zero MSB$_{ini}$ counts may not represent a spatial discontinuity. For example, the discontinuity may be due to artifacts in the depth image data rather than due to a change from one surface to another surface in the depth image data. To avoid leaving significant stepwise signals in the adjusted LSB data, the algorithm may minimize the quantization step. The quantization step (Qs) as discussed with regard to the process below refers to the range above and below the selected quantized MSB value that will be quantized to the selected quantized MSB value (i.e., [MD−Qs, MD+Qs], where MD is the selected quantized MSB value). An example segmentation process may be expressed as follows.

---

Depth data segmentation by depth quantization

1: for each depth block:
2:     Calculate the frequency histogram Hist of the MSB$_{ini}$ of the pixels in the depth block
3:     Find the maximum gap (G$_{max}$(Hist)) between the neighboring non-zero MSB$_{ini}$ counts in the histogram
4:     if the maximum gap is less than two (G$_{max}$(Hist) < 2) then
5:         Set quantization step Qs= $2^{(n-s-1)}$ − 1
6:     else
7:         Set step Qs = 0
8:     Find the MSB$_{ini}$ with the maximum frequency (Hist(dep)), and record the corresponding MSB$_{ini}$ as MSB depth MD
9:     Quantize the MSB values of pixels in the range [MD − Qs, MD + Qs] to MD
10:    Set the histogram values in the range to zero
11:    If maximum Hist(dep) > 0 then
12:        Go to line 8
13:    else
14:        Quantization is done

---

After obtaining the frequency histogram Hist of the MSB$_{ini}$ values (such as that shown in FIG. 9), the process determines the maximum histogram gap G$_{max}$ (Hist) between two neighboring non-zero MSB$_{ini}$ counts. If the G$_{max}$ is less than two, the variation of the depth block is smooth and its residual will be continuous after extracting MSB values. If so, the process sets the quantization step for the depth block to the maximum representable by the quantization difference ($2^{n-s-1}$−1). If the G$_{max}$ is greater than or equal to two, the block depth is discontinuous and the process encodes the depth information without quantization (by setting the quantization step Qs to zero). The use of the value two (2) in line 4 above is an example only and implementations of this process may use other values.

Once the quantization step size is set, the MSB$_{ini}$ value with the greatest histogram value (greatest frequency) is selected as a quantized MSB (or major depth) MD and pixels with MSB$_{ini}$ values in the range defined by the quantization step are quantized to the MD. The histogram values representing the MSB$_{ini}$ values in the range defined by the quantization step are then set to zero. Then, if there are no non-zero values in the histogram, the process is completed. Otherwise, process returns to the determination of the greatest remaining histogram value (greatest frequency) and selects this value as the next quantized MSB and the process continues until all values in the histogram are zero.

A second example depth data segmentation process is shown below that divides the histogram into sub-histograms based on gaps in the histogram to adaptively selects the quantization range. The second example segmentation process may be expressed as follows.

---

Depth data segmentation by histogram division and depth quantization

1: for each depth block:
2:     Calculate the frequency histogram Hist of the MSB$_{ini}$ of the pixels in the depth block
3:     Find the maximum gap (G$_{max}$(Hist)) between the neighboring non-zero MSB$_{ini}$ counts in the histogram
4:     if the maximum gap is less than two (G$_{max}$(Hist) < 2) then
5:         Divide the histogram to two sub-histograms Hist$_{left}$ and Hist$_{right}$ in terms of the position of G$_{max}$
6:         Recursively execute the process on Hist$_{left}$, from line 3
7:         Recursively execute the process on Hist$_{right}$, from line 3
8:     else
9:         if the range of MSB$_{ini}$values in Hist is less than the range representable by the quantization difference (Dr(Hist) < $2^{n-s}$) then
10:            Record the mean of the minimum and maximum MSB$_{ini}$ of Hist as the MD of the sub-histogram
11:            Quantize the MSB$_{ini}$ of pixels corresponding to the values in the sub-histogram to MD
12:        else
13:            Set quantization step Qs = $2^{n-s-1}$ − 1
14:            Find the MSB$_{ini}$ with the maximum frequency (Hist(dep)), and record the corresponding MSB$_{ini}$ as MSB depth MD
15:            Quantize the MSB values of pixels in the range [MD − Qs, MD + Qs] to MD
16:            Set the histogram values in the range to zero
17:            if maximum Hist (dep) > 0 then
18:                Go to line 14
19:            else
20:                Quantization is done

---

In the second example segmentation process shown above, after obtaining the frequency histogram Hist of the MSB$_{ini}$ values of the block, the process determines maximum histogram gap G$_{max}$(Hist) between two neighboring non-zero MSB$_{ini}$ counts. If the G$_{max}$ is less than two, the process sets the quantization step for the depth block to the maximum representable by the quantization difference ($2^{n-s-1}$−1). If the G$_{max}$ is greater than or equal to two, the process divides the histogram at the maximum histogram gap and recursively performs the process on the resulting two sub-histograms. As with the first example process, the use of the value two (2) in line 4 above is an example only and implementations of this process may use other values.

Once the process has recursively divided a sub-histogram to a point where no gap greater than two occurs, the process determines if the range of $MSB_{ini}$ values in the sub-histogram is less than the range representable by the quantization difference (i.e., if $Dr(Hist)<2^{n-s}$). If so, the process selects the mean of the minimum and maximum $MSB_{ini}$ value of the histogram as the quantized MSB (MD) and pixels with $MSB_{ini}$ values in the histogram are quantized to the MD. Else, the process sets the quantization step for the depth block to the maximum representable by the quantization difference ($2^{n-s-1}-1$). Then, the process continues in the same manner as in lines 8-14 of the first example segmentation process. Once all the recursive repetitions of the process have completed for the sub-histograms, the segmentation and quantization process is complete.

Figure 10:
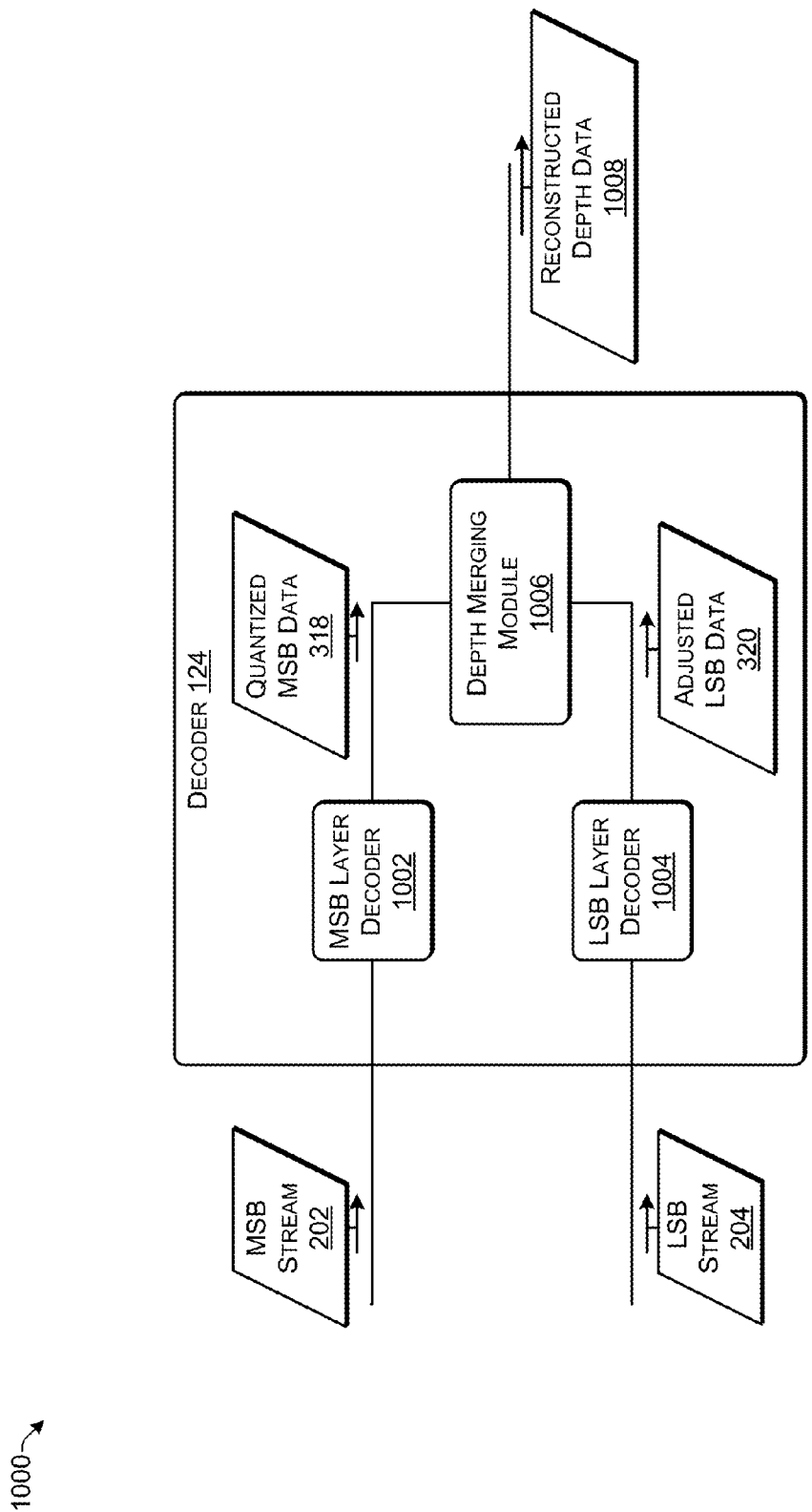
FIG. 10 is an example logical diagram of an illustrative decoder according to some implementations.

FIG. 10 illustrates an example logical diagram 1000 of the operation of an example implementation of the decoder 124. As illustrated in FIG. 10, the decoder 124 may include a MSB decoder 1002, a LSB decoder 1004 and a depth merging module 1006.

In operation, the MSB layer decoder 1002 may receive the MSB stream 202 and the LSB layer decoder 1004 may receive the LSB stream 204. The MSB layer decoder 1002 and LSB layer decoder 1004 decode the MSB stream 202 and LSB stream 204 using the appropriate decoders and provide the decoded quantized MSB data 318 and adjusted LSB data 320 to the depth merging module 1006. The depth merging module 1006 then regenerates the quantized MSB layer at the pixel level from the quantized MSB data 318. For example, in some implementations, the depth merging module 1006 may use the depth table 612 and the depth index 610 to generate the quantized MSB layer. The depth merging module 1006 may then combine the MSB layer and LSB layer to generate reconstructed depth data 1008. For example, this could be accomplished by shifting the bits of the MSB layer the appropriate number of bits (four in the example shown in FIG. 4), then adding the MSB value and LSB value of each pixel.

Figure 11:
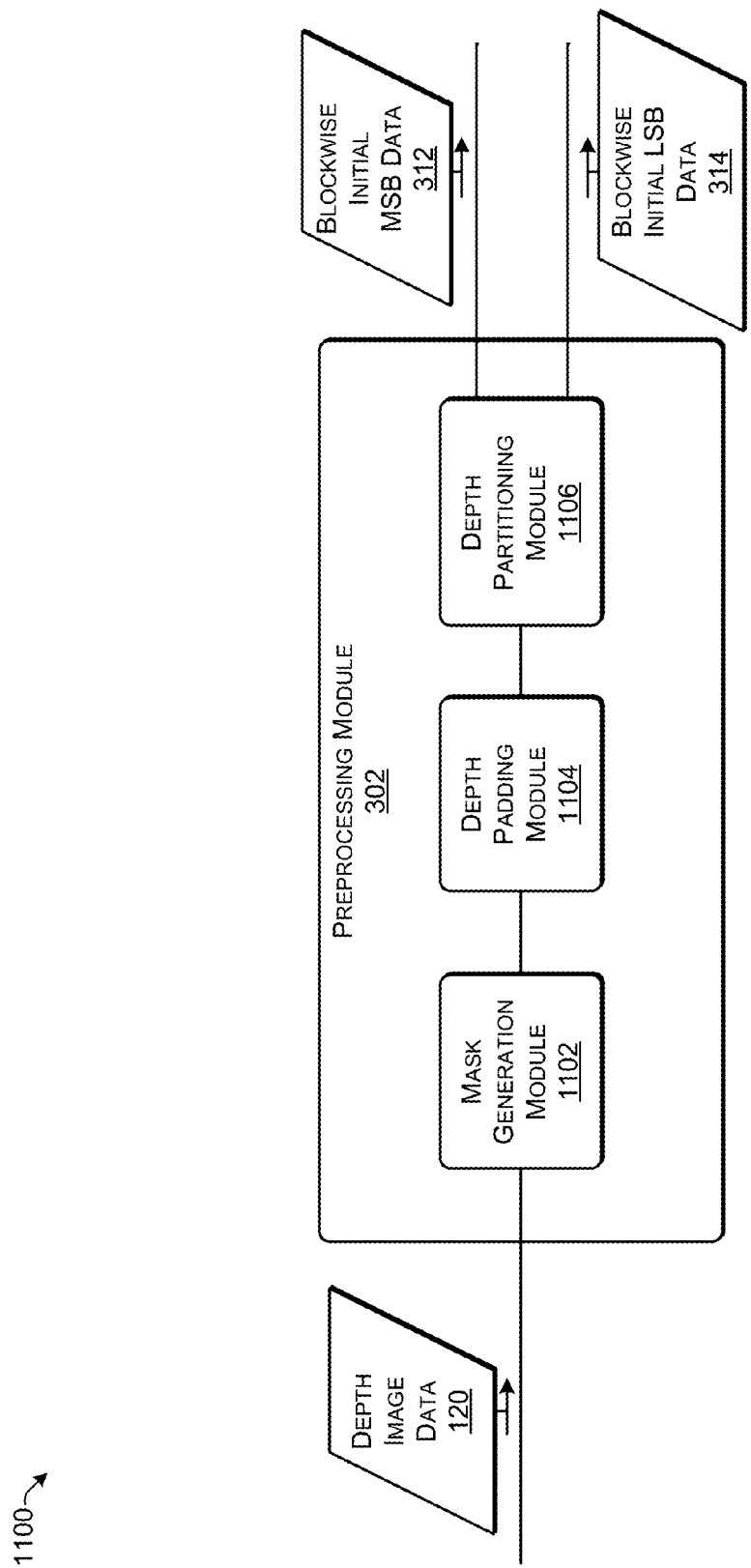
FIG. 11 is an example logical diagram of an illustrative preprocessing module according to some implementations

FIG. 11 illustrates an example logical diagram 1100 of the operation of an example implementation of the preprocessing module 302. In particular, the preprocessing module 302 shown in FIG. 11 is adapted to perform various operations such as filtering and cleaning of the depth image data 120. For example, the preprocessing module 302 may reduce the effect of invalid depth values in the depth image data 120 on the segmentation and encoding processes as discussed below. As illustrated in FIG. 11, the preprocessing module 302 may include a mask generation module 1102, a depth padding module 1104 and a depth partitioning module 1106.

In operation, the mask generation module 1102 receives the depth image data 120, for example, from the depth camera 112. In practice, the depth measurements in the depth image data 120 are often not perfect and there may exist one or more depth holes in the depth image. In such a case, the mask generation module 1102 may generate a binary mask map of the invalid depth values. The binary mask map may be used by the decoder to identify the invalid depth values at reconstruction. Moreover, in some implementations, even for an ideal depth measurement, only partial depth image data may be useful for further processing and may need to be compressed. In such a case, the mask generation module 1102 may generate a binary mask map in terms of the required portion for the compression of the depth image data 120. The binary mask map may be provided to the depth padding module 1104 and also encoded as side information that is encoded for later use by a decoder, such as decoder 124.

The depth padding module 1104 may receive the binary mask map and the depth image data 120. Using this information, the depth image data 120 may be padded at the block level. Specifically, regions indicated in the binary mask map as being unneeded or invalid are padded. In some implementations, these regions may be filled with a padding value, such as a mean value of the non-zero depth values within the block to reduce unnecessary sharp variations in the depth image data. The padded depth values will not affect the reconstructed depth image data because the padded depth values marked in the binary mask map may be removed at the decoder.

Once the regions have been padded, the padded depth image data may be provided to the depth partitioning module 1106 that may partition the padded depth image data into the blockwise initial MSB data 312 and blockwise initial LSB data 314 that is provided to the MSB layer module 304 and LSB layer module 306.

In some implementations, since the invalid depth values have been padded with the mean value of the valid depth within the block, the segmentation process may treat the padded values as a sub-region. Some implementations may avoid this, such as implementations that act to minimize the number of sub-regions in the quantized MSB data 318. Take for example a block in which a depth hole of invalid depth values exists along the boundary of an object. In such a case, the segmentation process may identify three segments, $DC_1$, $DC_2$, and $DC_3$. Specifically, the segmentation process may segment the depth block into a segment $DC_3$ of padded values between a segment $DC_1$ and a segment $DC_2$ that correspond to valid depth measurements. This is because, in the mean value implementation of the padding process, the pixel value of segment $DC_3$ may be set as:

$$DC_3 = \frac{N_1 \cdot DC_1 + N_2 \cdot DC_2}{N_1 + N_2}$$

where $N_1$ and $N_2$ are the number of pixels in segment $DC_1$ and segment $DC_2$. In the case that $DC_1$ and $DC_2$ are different surfaces, $DC_1$, $DC_2$ and $DC_3$ may be sufficiently distinct to require three quantized MSB values for the segmentation process to represent the range of MSB values in the block. As such, the segmentation process may utilize three quantized MSB values in the depth table.

In other implementations, to avoid the utilization of a value in the depth table for the invalid depth values, the depth value of the corresponding pixels in the invalid region may be set to the quantized MSB value of one of the valid segments $DC_1$ and $DC_2$ to reduce the number of segments. This may be performed by, for example, the preprocessing module 302 or by the MSB layer module 304 by reference to the binary mask map.

While several examples have been illustrated herein for discussion purposes, numerous other configurations may be used and thus implementations herein are not limited to any particular configuration or arrangement. For example, the discussion herein refers to the use of the minimum, median, mode or mean of MSB values to select a quantized MSB value for a group of pixels. This should not be taken as a limitation as such values need not necessarily be used. Rather, other selection processes for the quantized MSB value of the groups may be used. Moreover, while the discussion above refers to pixels in a depth image, other forms and representations of the depth image data may be subjected to the layered compression process disclosed above. Other variations in the logical and practical structure and framework of various implementations would be apparent to one of ordinary skill in the art in view of the disclosure provided herein.

The processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed. The processes illustrated herein are shown as a collection of operations in a logical flow graph, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed.

Figure 12:
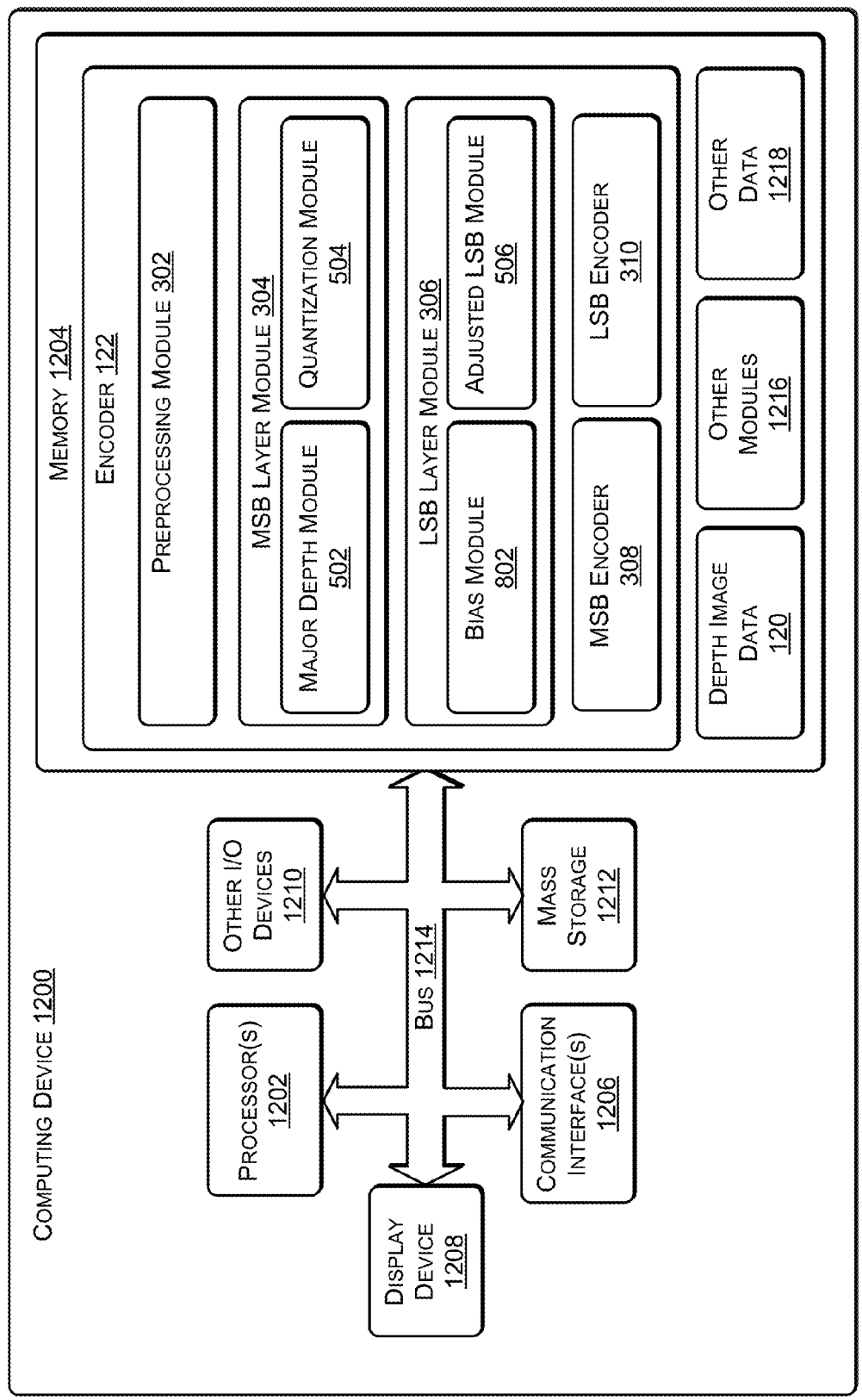
FIG. 12 illustrates an example computing system in which some implementations may operate.

FIG. 12 illustrates an example configuration of a computing device 1200 and an environment that can be used to implement the modules and functions described herein in an alternative implementation. The computing device 1200 may include at least one processor 1202, a memory 1204, communication interfaces 1206, a display device 1208 (e.g. a touchscreen display or other display), other input/output (I/O) devices 1210 (e.g. a touchscreen display or a mouse and keyboard), and one or more mass storage devices 1212, able to communicate with each other, such as via a system bus 1214 or other suitable connection. As an example, the computing device 1200 may be a general purpose computer that is processing raw or differently compressed depth image data 120 in the manner discussed above. In a particular example implementation, the computing device 1200 may receive depth image data 120 in a raw form or differently compressed form via communication interface(s) 1206 and process the received depth image data 120 in the manner discussed above to produce layered depth image data.

The processor 1202 may be a single processing unit or a number of processing units, all of which may include single or multiple computing units or multiple cores. The processor 1202 can be implemented as one or more microprocessors, microcomputers, microcontrollers, digital signal processors, central processing units, state machines, logic circuitries, and/or any devices that manipulate signals based on operational instructions. Among other capabilities, the processor 1202 can be configured to fetch and execute computer-readable instructions stored in the memory 1204, mass storage devices 1212, or other computer-readable media.

Memory 1204 and mass storage devices 1212 are examples of computer storage media for storing instructions which are executed by the processor 1202 to perform the various functions described above. For example, memory 1204 may generally include both volatile memory and non-volatile memory (e.g., RAM, ROM, or the like). Further, mass storage devices 1212 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1204 and mass storage devices 1212 may be collectively referred to as memory or computer storage media herein, and may be capable of storing computer-readable, processor-executable program instructions as computer program code that can be executed by the processor 1202 as a particular machine configured for carrying out the operations and functions described in the implementations herein.

The computing device 1200 may also include one or more communication interfaces 1206 for exchanging data with other devices, such as via a network, direct connection, or the like, as discussed above. The communication interfaces 1206 can facilitate communications within a wide variety of networks and protocol types, including wired networks (e.g., LAN, cable, etc.) and wireless networks (e.g., WLAN, cellular, satellite, etc.), the Internet and the like. Communication interfaces 1206 can also provide communication with external storage (not shown), such as in a storage array, network attached storage, storage area network, or the like.

A display device 1208, such as a touchscreen display or other display device, may be included in some implementations. Other I/O devices 1210 may be devices that receive various inputs from a user and provide various outputs to the user, and may include a touchscreen, a keyboard, a remote controller, a mouse, a printer, audio and/or voice input/output devices, and so forth.

Memory 1204 may include modules and components for the computing device 1200 according to the implementations discussed herein. In the illustrated example, memory 1204 may include the encoder 122 which may include the preprocessing module 302, MSB layer module 304, the LSB layer module, the MSB encoder 308 and LSB encoder 310. In particular, the example computing device 1200 is an example of a computing device which receives depth image data 120 in an uncompressed or differently compressed form and performs the layered compression functionality discussed above. As such, the example computing device 1200 includes modules for performing the layered compression functions discussed above (i.e., it includes the preprocessing module 302, MSB layer module 304, the LSB layer module, the MSB encoder 308 and LSB encoder 310). The memory 1204 may further include one or more other modules 1216, such as drivers, application software, communication software, other service modules, or the like. In the case of the depth image data 120 being differently compressed depth image data, the other modules 1216 may include modules for decompressing, decoding, or otherwise returning the differently compressed depth image data into a "raw" unprocessed form. Memory 1204 may also include other data 1218, such as data stored while performing the functions described above and data used by the other modules 1216. Memory 1204 may also include other data and data structures described or alluded to herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module,"

"mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 12 as being stored in memory 1204 of computing device 1200, the encoder 122, or portions thereof, may be implemented using any form of computer-readable media that is accessible by computing device 1200. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

Further, although the modules are illustrated in FIG. 12 as being stored in memory 1204 of computing device 1200, in other implementations, the modules, or portions thereof, may be implemented as an application specific integrated circuit (ASIC) or other form of special purpose computing device and integrated with the other hardware and software components of computing device 1200.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A depth camera device comprising:
   a depth camera that captures depth image data having a bit depth of N-bits;
   one or more processors;
   one or more computer-readable storage media storing computer-executable instructions of an encoder module executed by one or more processors to:
   partition the depth image data into an M-bit most significant bit (MSB) layer and an L-bit least significant bit (LSB) layer, the M-bit MSB layer including a M most significant bits of the depth image data and the L-bit LSB layer including a N-M least significant bits of the depth image data;
   quantize the MSB layer;
   generate quantization difference data based at least in part on the MSB layer and the quantized MSB layer; and
   apply the quantization difference data to the LSB layer to generate an adjusted LSB layer.

2. The depth camera device of claim 1, wherein N is twelve and M and L are eight.

3. The depth camera device of claim 1, wherein the quantization difference data has a bit depth of (M+L)−N bits.

4. The depth camera device of claim 1, wherein the MSB layer is divided into blocks prior to being quantized.

5. The depth camera device of claim 4, wherein the quantizing of the MSB layer is performed at a block level, the quantizing of at least one block comprising:
   determining a range of MSB values in the block;
   if the range of the MSB values in the block is greater than a range representable by a bit depth of the quantization difference data, dividing the block into a plurality of segments based on a depth value distribution of the block;
   quantizing at least one segment of the depth image data to a major depth of the MSB values of the segment; and
   determining the quantization difference data of one or more pixels in the at least one quantized segment based at least in part on a difference of the MSB value of the pixels and the major depth of the segment.

6. A computer-implemented method comprising:
   under control of one or more processors configured with executable instructions,
   partitioning depth image data into a most significant bit (MSB) layer and a least significant bit (LSB) layer;
   quantizing the MSB layer;
   generating quantization difference data based at least in part on the quantizing of the MSB layer; and
   applying the quantization difference data to the LSB layer to generate an adjusted LSB layer.

7. The computer-implemented method of claim 6, further comprising;
   losslessly encoding the quantized MSB layer; and
   lossy encoding the adjusted LSB layer.

8. The computer-implemented method of claim 6, wherein the MSB layer and the LSB layer have different bit depths, the sum of the bit depth of the MSB layer and the bit depth of the LSB layer being greater than the bit depth of the depth image data, wherein the bit positions of one or more of the bits of the MSB data overlap with the bit positions of one or more bits of the LSB data.

9. The computer-implemented method of claim 8, wherein the bit depth of the quantization difference is a number of bits of overlap of the bit positions of the MSB layer and the bit positions of the LSB layer.

10. The computer-implemented method of claim 8, the quantizing the MSB layer comprising:
   determining a range of MSB values in the depth image data;
   if the range of the MSB values in the depth image data is greater than a range representable by a bit depth of the quantization difference data, dividing the depth image data into a plurality of segments;
   quantizing at least one segment of the depth image data to a particular number in the range of the MSB values of the segment; and
   determining the quantization difference data of one or more pixels in the at least one quantized segment based at least in part on the difference of the MSB value of the pixel and the particular number in the range.

11. The computer-implemented method of claim 10, wherein the depth image data is divided into two segments based at least in part on the median MSB value of the MSB values of the depth image data.

12. The computer-implemented method of claim 11, the quantizing the MSB layer comprising:
   determining a count of occurrences of the MSB values in the MSB layer data;
   dividing the MSB values into one or more ranges of MSB values, the ranges of MSB values being without gaps greater than a maximum gap size between the MSB values with non-zero counts in the ranges; and
   quantizing the MSB values of pixels in one of the ranges of MSB values of the depth image data to a particular number in the range of MSB values.

13. The computer-implemented method of claim 10, wherein the particular number in the range of MSB values is one of:
   the median value of the MSB values in the range;
   a mean value of the MSB values in the range; or
   a mode value of the MSB values in the range.

14. The computer-implemented method of claim 6, further comprising, prior to quantizing the MSB layer:
   generating a bit mask of the pixels of the depth image data that maps depth values that are invalid depth values; and
   padding values in the MSB layer corresponding to the invalid depth values with values based at least in part on neighboring valid depth values.

15. The computer-implemented method of claim 6, further comprising, prior to applying the quantization difference data to the LSB layer, biasing the LSB layer.

16. The computer-implemented method of claim 6, wherein the values of the quantized MSB layer are represented in the form of a depth index mapping pixels in the depth image data to one or more quantized MSB values.

17. One or more computer storage media storing computer-executable instructions that, when executed on one or more processors, perform acts comprising:
   partitioning image data associated with a plurality of pixels of the image data into most significant bit (MSB) data of the pixels and least significant bit (LSB) data of the pixels;
   losslessly encoding the MSB data; and
   lossy encoding the LSB data.

18. The one or more computer storage media of claim 17, the acts further comprising:
   prior to encoding the MSB data, quantizing the MSB data.

19. The one or more computer storage media of claim 18, the acts further comprising:
   generating quantization difference data for a plurality of pixels based at least in part on a difference between quantized MSB values of the plurality of pixels and an MSB value of the plurality of pixels; and
   prior to encoding the LSB data, adjusting the LSB data based at least in part on the quantization difference data.

20. The one or more computer storage media of claim 17, wherein the image data is depth image data.

* * * * *